Oct. 14, 1947.                J. H. LESLIE, 2D                2,429,101
       AIRCRAFT HOT AIR HEATER WITH AIR SPEED RESPONSIVE FUEL SUPPLY
                    Filed Dec. 10, 1943          5 Sheets-Sheet 4

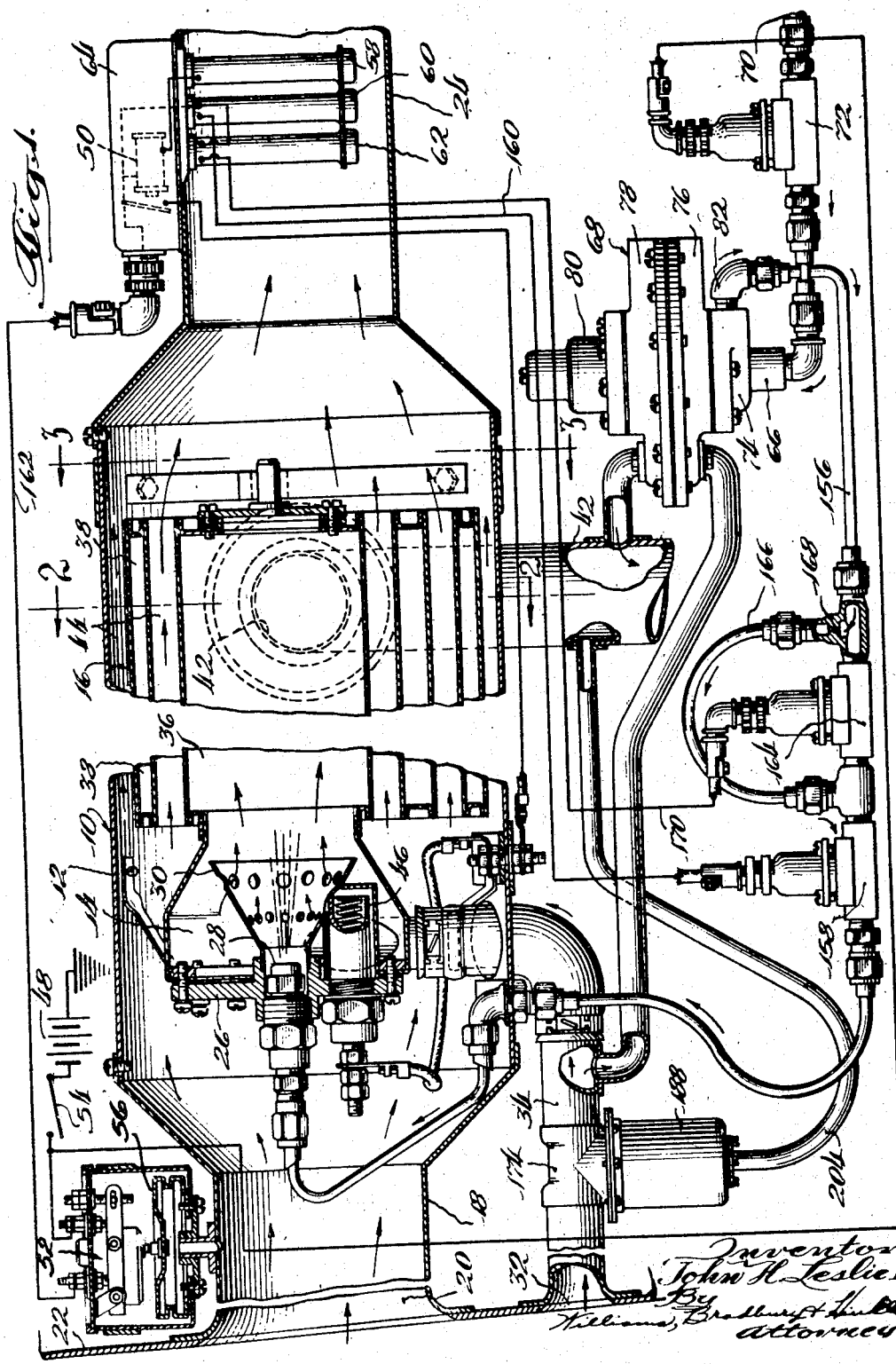

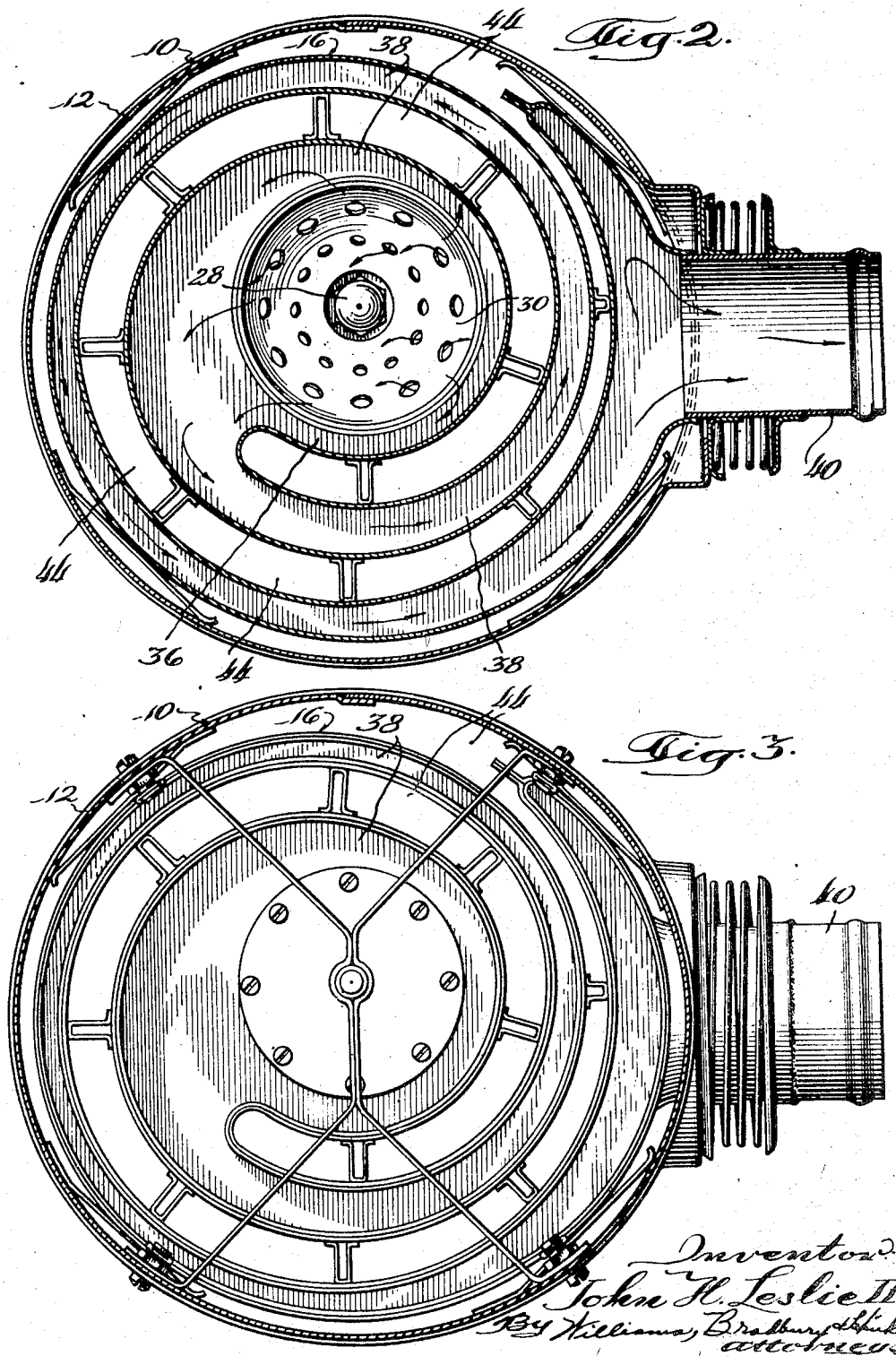

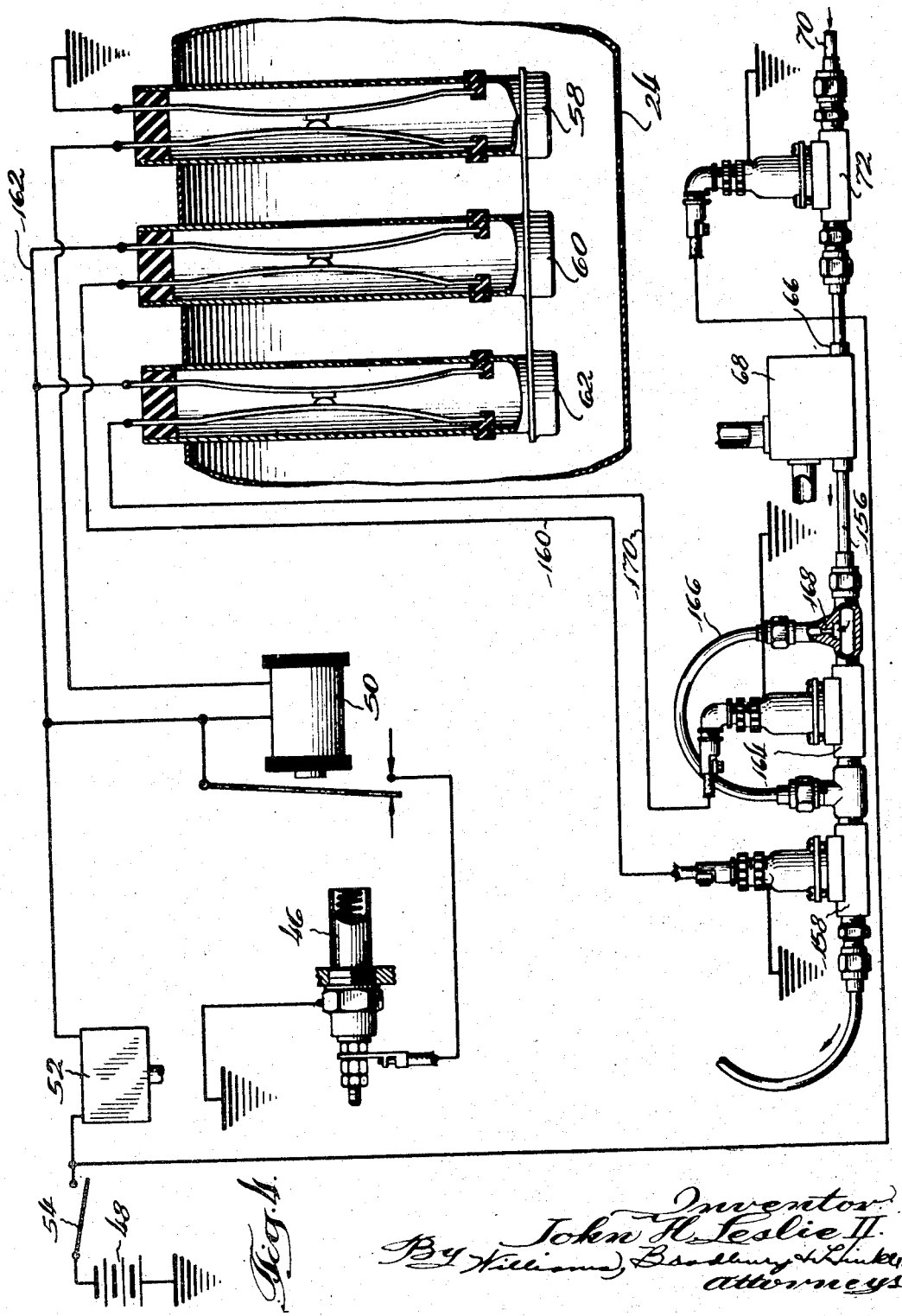

Inventor:
John H. Leslie II
By Williams, Bradbury & Hinkle
Attorneys

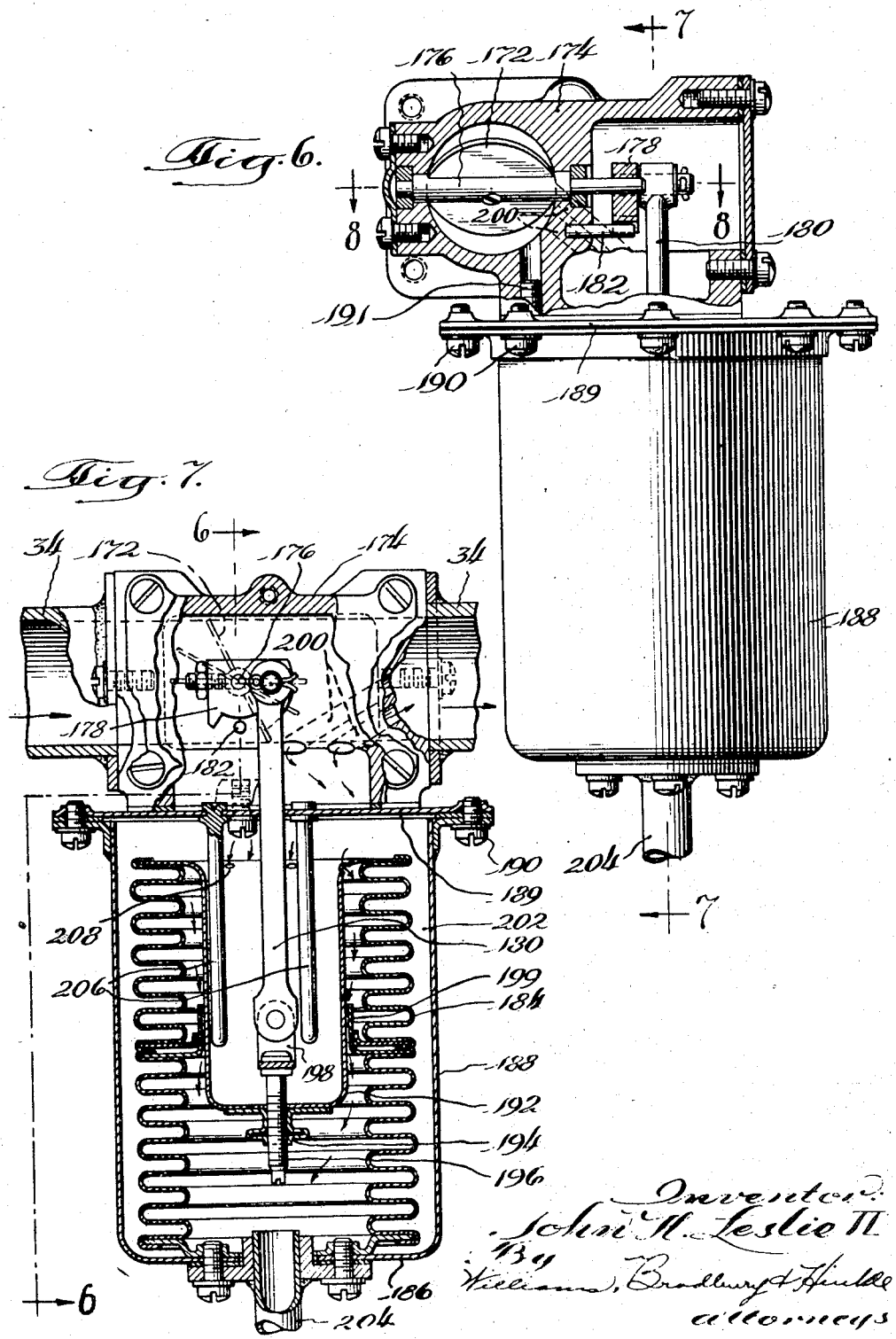

Patented Oct. 14, 1947

2,429,101

UNITED STATES PATENT OFFICE 2,429,101

AIRCRAFT HOT-AIR HEATER WITH AIR SPEED RESPONSIVE FUEL SUPPLY

John H. Leslie, II, Winnetka, Ill., assignor to Stewart-Warner Corporation, Chicago, Ill., a corporation of Virginia Application December 10, 1943, Serial No. 513,732

4 Claims. (Cl. 126—110)

My invention relates to controls for heating systems and more particularly to controls for the internal combustion heating systems used in aircraft.

An object of my invention is to provide a new and improved control for internal combustion heating systems of aircraft to make such heating systems respond more precisely and quickly to variations in the heating needs of the aircraft.

Another object of my invention is to provide a new and improved control for internal combustion heating systems which will permit said heating systems to respond more readily and efficiently to varying operating conditions. To this end, it is one of my objects to make the feed of fuel to the heater responsive to the varying pressures of the air at the combustion air inlet of the heater.

Another object of my invention is to provide new and improved means for regulating the combustion air supplied to the internal combustion heater of a heating system.

Another object of my invention is to provide a new and improved heating system particularly adapted for dive bombers.

Another object of my invention is to provide a new and more flexible control which is inexpensive to manufacture and install and which will afford long and trouble-free service.

Other objects and advantages will become apparent as the description proceeds.

In the drawings:

Fig. 1 is a view of a heating system embodying a preferred form of my invention and showing the heater and certain other parts in section for clearer disclosure of details of construction;

Fig. 2 is a view showing a transverse section of the heater taken on the line 2—2 of Fig. 1;

Fig. 3 is a view showing a transverse section of the heater taken on the line 3—3 of Fig. 1;

Fig. 4 is a diagrammatic illustration of the electrical circuits;

Fig. 6 is an irregular, sectional view of the combustion air control mechanism and is taken on line 6—6 of Fig. 7;

Fig. 7 is a sectional view taken on line 7—7 of Fig. 6; and

Figure 5:
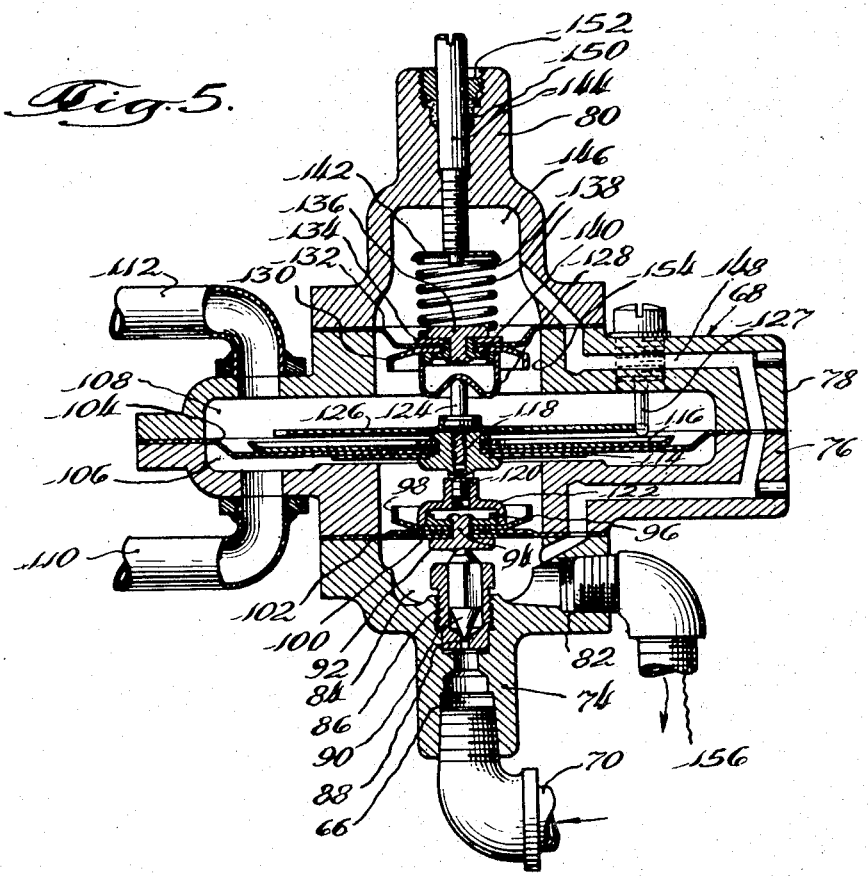
Fig. 5 is an enlarged, sectional view of the pressure carburetor.

In Fig. 1, I have illustrated a heating system comprising an internal combustion heater 10 having a casing 12 enclosing a combustion chamber 14 and a heat exchanger 16. The lefthand end of the casing 12 as shown in Fig. 1 is connected to a ventilating air pipe 18 which is supplied with ventilating air by a ram 20 located in a forward wall 22 of a part of an aircraft structure. The ventilating air supplied by the ram 20 flows around the walls of the combustion chamber 14 and through the heat exchanger 16 and absorbs heat therefrom. The heated ventilating air passes from the righthand end of the casing 12 into a ventilating air duct 24 leading to a cabin, wing surface, or other spaces or parts to be heated.

In the heater shown in Fig. 1, the fuel consumed in the combustion chamber is delivered to this chamber by a nozzle 28 threaded into an end wall 26 of the combustion chamber. This nozzle delivers the fuel in the form of a conical spray coaxial with a sheet metal cone 30 extending into the combustion chamber and secured to the end wall 26 thereof. The combustion air is supplied to the combustion chamber 14 by a combustion air ram 32 which is connected to the combustion chamber by a combustion air pipe 34. The cone 30 is perforated, as clearly shown in Fig. 1, so that part of the air delivered to the combustion chamber can flow through the perforations in this cone to mix with the fuel delivered by the nozzle 28, whereas the remainder of the combustion air flows around the end of the cone 30 to mix with the unburned fuel.

The products of combustion created in the combustion chamber flow into the central passage 36 of the heat exchanger 16 and thence through a spiral passage 38 to an outlet 40 connected to an exhaust pipe 42 through which the cooled products of combustion are discharged to atmosphere. The heat exchanger 16 has ventilating air passages 44 and the walls separating the passages 44 from the central passage 36 and spiral passage 38 are of thin metal to facilitate the transfer of heat from the hot products of combustion to the ventilating air. The particular heat exchanger shown herein is like that disclosed in the application of William C. Parrish, Serial No. 494,155, filed July 10, 1943, and assigned to the assignee of the present application.

The mixture of fuel and air formed in the combustion chamber is ignited by an electrical igniter 46 which is illustrated as being in the form of a plug threaded into the end wall of the combustion chamber. This electrical igniter is supplied with current from a battery 48, or other suitable source of electrical energy and means is provided to disconnect the igniter 46 from its source of current after the heater attains normal operation. Means is also provided to prevent the igniter from initiating heater operation when the air pressure at the ram 20 is insufficient to create a proper flow of ventilating air through the heater.

Referring to Fig. 4, it will be seen that the igniter 46 is connected with the battery 48 by a circuit including a relay 50, a ventilating air pressure responsive switch 52, and a manual switch 54, which is the master switch for starting and stopping heater operation. The ventilating air pressure responsive switch 52 is shown more fully in Fig. 1. This switch is biased toward open position and is held closed by a diaphragm 56 only so long as the pressure in the ventilating air pipe 18 is sufficient to create an adequate flow of ventilating air through the heater. If at the time the manual switch 54 is closed to initiate heater operation, the ram 20 is not creating sufficient ventilating air pressure to afford adequate flow through the heater, the switch 52 will remain open and the igniter 46 will be cut off from the battery 48 and will, therefore, be unable to initiate heater operation.

Referring again to Fig. 4, it will be seen that the relay 50 is controlled by a Fenwall switch 58 located in the ventilating air duct 24. The switch 58 is normally closed and opens only when the temperature of the ventilating air in the duct 24 reaches a predetermined value, at which time this switch breaks the circuit to the relay 50, which in turn opens the circuit to the igniter 46. The Fenwall switch 58 and two similar switches 60 and 62 are unitary with a box 64 containing the relay 50 and adapted for attachment to a wall of the duct 24 in such manner that the three Fenwall switches project into the duct through a slot in the wall thereof. Gasoline or other suitable fuel for the heater is delivered to the inlet 66 of a flow control valve 68 by a pipe 70 connected to a source of fuel under constant pressure. The valve 68 is commonly called a pressure carburetor. A solenoid shut off valve 72 is located in the pipe 70 and serves to prevent all flow of gasoline to the carburetor 68 except when the master switch 54 is closed.

This pressure carburetor is best shown in Fig. 5 and comprises a base casting 74, a pair of intermediate castings 76 and 78 and an upper casting 80 secured together by screws (not shown) or in any other suitable manner. The base casting 74 provides a fuel inlet 66 and a fuel outlet 82 connected through a valve chamber 84. A nipple 86 is threaded into the casting 74 and provides a valve seat 88 adapted to be engaged by the conical lower end of a valve member 90. This valve member is reciprocably mounted in the nipple 86 and the largest portion of this valve member is preferably triangular, as shown, to permit flow of fuel therepast.

The valve member 90 is moved upwardly by the difference in fuel pressure between the inlet 66 and outlet 82 and is urged towards closed position by the force exerted thereon by a pressure plate 92. The pressure plate 92 has a rivet-like extension 94 whose upper end is clamped over a disc 96. A tapered cup 98 and a second disc 100 are confined between the head of the pressure plate 92 and the disc 96 and the central portion of a flexible diaphragm 102 is clamped between the cup 98 and disc 100. The periphery of this diaphragm is clamped between base casting 74 and intermediate casting 76. The diaphragm may be of metal or fabric coated or impregnated with synthetic rubber or other suitable material.

A second flexible diaphragm 104 has its periphery clamped between intermediate castings 76 and 78 and cooperates with these castings to form a variable lower chamber 106 and a variable upper chamber 108 on opposite sides of the diaphragm 104. A pipe 110 connects the lower chamber 106 with the combustion air ram 20 and a pipe 112 connects the upper chamber 108 with the combustion air outlet duct 42 so that the differential pressure across the diaphragm 104 reflects the combustion air pressure drop across the heater. The central portion of the diaphragm 104 is reinforced by discs 114 and 116 located on opposite sides thereof. These discs are attached to a hub 118 having a depending screw 120 carrying a foot 122 provided with a cylindrical lower end which presses against the base of the cup 98 and surrounds the disc 96 to maintain proper alignment of this disc with the hub 118.

The hub 118 has a threaded central bore therein which rotatably receives the threaded lower end of a pin 124 carrying an adjusting plate 126 whose outer edge is notched so that the plate and pin can be rotated by engaging the notched edge of the plate by a screw driver or other suitable tool, to thereby screw the pin 124 into or out of the hub 118. A rod 127 normally engages the notched edge of plate 126 to hold the plate in adjusted position. The upper end of this rod is threaded or otherwise removably secured in the casting 78.

The upper end of the pin 124 is rounded, as clearly shown in Fig. 5, and fits into a recess provided in the base of a sheet metal cup 128 whose upper end engages dished plate 130 forming a reinforcement for the central portion of a third diaphragm 132. A second reinforcement plate 134 is located on the opposite side of this diaphragm, and these plates are secured to the diaphragm by a rivet 136 having an enlarged head forming a guide for a light spring 138. The rivet 136 also secures in place a guide 140 located in the upper end of the cup 128 and maintaining this cup in axial alignment with the rivet 136.

The upper end of the spring 138 rests against a washer 142 carried by a screw 144 threaded into the upper casting 80 and adjustable to vary the tension of the spring 138. The chamber 146 formed above the upper diaphragm 132 is connected to a valve chamber 84 by a duct 148 extending through the several castings and appropriate openings in the diaphragms clamped therebetween. This passageway 148 conducts fuel to the upper chamber 146 so that the pressure carburetor would be balanced with respect to the fuel pressure in the chamber 84 and pipe leading to nozzle 28, if the upper diaphragm 132 and the lower diaphragm 102 had the same effective area and were otherwise equivalents.

In order to prevent leakage of fuel around the screw 144, packing 150 is provided to form a seal between the screw 144 and casting 80, and a nut 152 is provided to hold this packing firmly in place.

From the foregoing description of the pressure carburetor, it will be apparent that the spring 138 exerts a downward pressure which urges the valve member 90 toward the closed position. This spring is relatively light, and its sole function is to hold the valve member 90 in closed position when the heater is not operating and thus prevent flow of fuel to the nozzle 28. When there is sufficient flow of combustion air through the heater for proper operation of this heater, the pressure drop across the diaphragm 104 will be sufficient to overcome the spring 138 and permit valve member 90 to open.

The three diaphragms of the pressure carburetor may be formed of the same or different materials. The upper diaphragm 132 and lower diaphragm 102 are designed to provide different effective areas so that the fuel pressure acting thereon creates a differential pressure opposing the differential pressure across the large diaphragm 104. The fuel pressure acting on diaphragms 132 and 102 is the pressure in chamber 84 so that for every pressure differential across the large diaphragm 104 there is a corresponding position for the valve 90 and a corresponding fuel pressure in the chamber 84. The amount of fuel delivered to the heater is determined by the size of the nozzle 28, but for any given nozzle the rate of fuel delivery varies with variations in pressure in chamber 84, and corresponds to the varying fuel needs of the heater.

The different operating characteristics of the diaphragms 102 and 132 may be obtained by making the bore 154 in the intermediate casting 78 slightly larger than the corresponding bore in the casting 76 so that the maximum effective area of the upper diaphragm 132 is greater than that of the lower diaphragm 102. In the particular pressure carburetor shown, this difference in diameter amounts to one-sixteenth ($\frac{1}{16}$) of an inch, but this figure is to be considered illustrative only, as other sizes of bores may be utilized in other installations. The upper diaphragm is also preferably under tension so that the effective area of this diaphragm decreases as the central portion of the diaphragm moves downwardly, whereas the lower diaphragm is preferably free from such tension.

The valve chamber 84 of the pressure carburetor is connected to the nozzle 28 by a pipe line 156 containing a solenoid shut-off valve 158. This shut-off valve is connected by an electrical conductor 160 to one contact of a Fenwall switch 60. The other contact of this switch is connected to the battery 48 through electrical conductor 162, ventilating air pressure switch 52 and manual switch 54. The Fenwall switch 60 is normally closed and opens only when the ventilating air in the duct 24 reaches an abnormally high temperature. Opening of this switch closes valve 158 and cuts off the fuel supply to the nozzle 28.

I have also illustrated my heating system as having a two-level operating control comprising a third solenoid valve 164 located in the fuel pipe 156 and a bypass 166 around this valve. The bypass 166 has a restriction 168 therein which permits only limited fuel flow through the bypass so that when the valve 164 is closed, the heater can operate at only partial output. On the other hand, when the valve 164 is open, maximum flow of fuel may occur through this valve.

The two-level control valve 164 is connected by a conductor 170 to the Fenwall switch 62, which is normally closed, and which connects this valve to the battery 48 through conductor 162, ventilating air pressure switch 52 and manual switch 54. The Fenwall switch 62 is set to open before the opening of the Fenwall switch 60 so that upon rise of temperature of the ventilating air the two-level valve 164 will close before the shut-off valve 158 closes, and the latter valve will not close if closing of the two-level valve 164 reduces heater operation sufficiently to prevent overheating of the ventilating air flowing through the heater.

Figure 8:
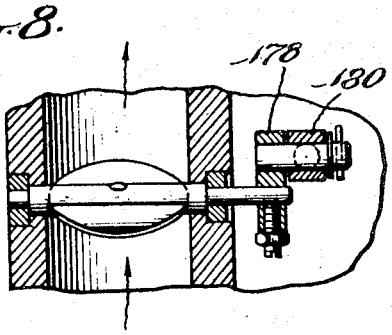
Fig. 8 is a sectional view taken on line 8—8 of Fig. 6.

I also provide means to regulate the flow of combustion air to the combustion chamber so that this chamber will receive the proper quantities of combustion air and fuel to give maximum efficiency under all conditions of operation. The flow of combustion air to the combustion chamber is regulated by a butterfly valve 172 (Figs. 6, 7 and 8) located in the bore of a casting 174 forming a part of the pipe 34 leading from the combustion air ram 32 to the combustion chamber. The valve 172 is mounted on a shaft 176 supported in the casting 174. The shaft 176 has an operating arm 178 moved by a link 180 to shift the position of the valve. A stop pin 182 is adapted to engage either of two opposing shoulders formed in the arm 178 to limit movement of the valve 172 in either direction.

The position of the butterfly valve 172 is controlled by mechanism which is operated by the same differential force which operates the pressure carburetor 68, in other words by the pressure differential of the combustion air across the heater. The operating mechanism for the valve 172 comprises a Sylphon 184 attached at its lower end to the base 186 of a sheet metal housing 188 whose upper end is secured to a plate 189 by screws 190. This plate is secured to casting 174 by screws 191. A sheet metal cup 192 has a flange at its upper end which is secured to the upper end of the Sylphon 184. The cup 192 has a shakeproof nut 194 secured to the bottom thereof and this nut adjustably receives the screw 196 mounted in the pivoted extension 198 of the valve operating rod 180. The Sylphon 184 has a cylindrical guide 199 loosely surrounding the cup 192.

Bores 200 in the casting 174 connect the chamber 202 surrounding the Sylphon 184 with that part of the combustion air pipe 34 to the right of the valve 172. The interior of the Sylphon 184 is connected by a pipe 204 to the heater exhaust pipe 42, so that the Sylphon 184 is exposed to the pressure drop of the combustion air in passing through the heater. Increase in this pressure drop causes the Sylphon 184 to contract and move the valve 172 toward closed position, whereas a reduction in this pressure drop permits the Sylphon to expand and move the valve 172 toward open position.

Movement of the cup 192 and upper end of the Sylphon 184 is guided by three pins 206 arranged in the form of a triangle and attached to the plate 189. Cup 192 is provided with a circular series of openings 208 which provide for limited air flow through the Sylphon 184 and prevent this Sylphon from being filled with and attacked by corrosive exhaust gases discharged by the heater.

In normal operation of the airplane, when the pressure drop between the combustion air ram inlet 32 and the exhaust pipe 42 varies within a rather limited range, the pressure carburetor 68 is effective to regulate the rate of fuel supply and thus to maintain the proper fuel-air mixture ratio.

However, under the conditions of extreme velocity in the flight of the airplane, the butterfly valve 172 becomes effective to change the rate of airflow to the combustion chamber, since under these circumstances the control effected by the pressure carburetor 68 is not sufficient to assure the proper fuel-air mixture ratio. The heating system is thus particularly adapted for use on military airplanes which are operated throughout a wide range of speeds.

While I have described the chamber 108 of the control valve 68 and the interior of the bellows 184 as being connected with the exhaust pipe 42 of the heater, I do not wish to be restricted to this particular arrangement except so far as it is specifically claimed. Inasmuch as the pressure in the exhaust pipe is always very close to that of the atmosphere to which the exhaust pipe opens, it will be understood that the operation of the heater would be changed very little if at all if the pipes 112 and 204 were vented to the atmosphere instead of being connected with the exhaust pipe 42. With the parts arranged as shown in the drawings, the feed of fuel and combustion air to the heater is controlled substantially by the varying pressure at the air inlet 32 for combustion air, and this same result would be attained to a large extent if the pipes 112 and 204 opened to the atmosphere.

The heating system which I have illustrated and described has extremely flexible controls whereby changes in dimensions and operating ranges of the controls can be readily effected to accommodate this heating system for use under widely different operating conditions. While I have illustrated and described only a single embodiment of my invention, it is to be understood that my invention is not limited to the details shown and described but may assume numerous other forms and that my invention includes all modifications, variations and equivalents coming within the following claims.

I claim:

1. In a heating system for aircraft, including an internal combustion heater having a heat exchanger and a combustion chamber, means including a ram which supplies ventilating air to the heat exchanger at a rate which varies with the speed of the aircraft, a source of fuel under constant pressure, a fuel nozzle discharging into said combustion chamber, a fuel feed conduit connecting said fuel source and said nozzle, a fuel feed valve in said conduit, a combustion air pipe leading to the combustion chamber, a second ram which supplies air to said pipe at a pressure which varies with the speed of the aircraft, pressure responsive means subject to the pressure in said pipe and connected to actuate said fuel feed valve for varying the quantity of combustible mixture furnished to the heater in response to changes in air speed of the aircraft, and a valve in said air pipe and pressure responsive means subject to the pressure in said pipe and connected to actuate said valve for reducing the quantity of air admitted to said pipe from the second ram as the ram pressure becomes excessive at the higher speeds attained by the aircraft.

2. In a heating system for aircraft, including an internal combustion heater having a heat exchanger and a combustion chamber, ram means arranged to furnish ventilating air to said heat exchanger and combustion air to said combustion chamber whereby the ram pressure varies with the speed of the aircraft, a source of fuel under constant pressure, a fuel nozzle discharging into the combustion chamber, a fuel feed conduit connecting said fuel source with said nozzle, a combustion air pipe connecting said ram means with the combustion chamber whereby a combustible mixture of fuel and air is formed in said chamber, a fuel feed valve in said conduit, pressure responsive means subject to the pressure in said combustion air pipe and connected to actuate said fuel valve for regulating the feed of fuel in proportion to the air supplied through said pipe as said air supply varies with changes in air speed of the aircraft, and a valve in said air pipe and pressure responsive means subject to the pressure in said pipe and operable to constrict the passage therein as the ram pressure becomes excessive at the higher speeds attained by the aircraft.

3. In a heating system for aircraft, including an internal combustion heater having a heat exchanger and a combustion chamber, ram means arranged to furnish ventilating air to said heat exchanger and combustion air to said combustion chamber whereby the ram pressure varies with the speed of the aircraft, a source of fuel under constant pressure, a fuel nozzle discharging into the combustion chamber, a fuel feed conduit connecting said fuel source with said nozzle, a combustion air pipe connecting said ram means with the combustion chamber whereby a combustible mixture of fuel and air is formed in said chamber, a fuel feed valve in said conduit, pressure responsive means subject to the pressure in said combustion air pipe and connected to actuate said fuel valve for regulating the feed of fuel in proportion to the air supplied through said pipe as said air supply varies with changes in air speed of the aircraft, an exhaust passage leading from the combustion chamber, a valve in said air pipe, a pressure responsive means including a flexible diaphragm connected to actuate said valve, a duct leading from the combustion air pipe to one side of said diaphragm, and a duct leading from the exhaust passage to the other side of said diaphragm to subject the diaphragm to the pressure drop across the heater, said diaphragm being perforated to permit a limited flow of air through it to scavenge the side exposed to the exhaust passage.

4. In a heating system for aircraft, including an internal combustion heater having a heat exchanger and a combustion chamber, ram means arranged to furnish ventilating air to said heat exchanger and combustion air to said combustion chamber whereby the ram pressure varies with the speed of the aircraft, a source of fuel under constant pressure, a fuel nozzle discharging into the combustion chamber, a fuel feed conduit connecting said fuel source with said nozzle, a combustion air pipe connecting said ram means with the combustion chamber whereby a combustible mixture of fuel and air is formed in said chamber, a fuel feed valve in said conduit, pressure responsive means subject to the pressure in said combustion air pipe and connected to actuate said fuel valve for regulating the feed of fuel in proportion to the air supplied through said pipe as said air supply varies with changes in air speed of the aircraft, a conduit conducting the heated ventilating air from the heat exchanger, said fuel feed conduit including a restricted passage and a full flow passage, valve means adjustable to confine the flow to the restricted passage or to permit flow through said full flow passage, and thermostatic means in the ventilating air conduit subject to the heated air therein and operable to adjust said valve means for full flow until the air attains a predetermined temperature and then to adjust said valve means for restricted flow.

JOHN H. LESLIE, II.

REFERENCES CITED

The following references are of record in the file of this patent:

UNITED STATES PATENTS

| Number | Name | Date |
|---|---|---|
| 1,343,098 | Stephens | June 8, 1920 |
| 2,212,606 | Klinker | Aug. 27, 1940 |
| 1,765,549 | Thurm | June 24, 1930 |
| 897,732 | Gerdes | Sept. 1, 1908 |
| 2,337,484 | McCollum | Dec. 21, 1943 |
| 1,884,256 | Rogers et al. | Oct. 25, 1932 |
| 1,958,913 | Coriolis et al. | May 15, 1934 |
| 1,814,163 | Irwin | July 14, 1931 |
| 1,862,690 | Macrae et al. | June 14, 1932 |
| 2,112,391 | Anxionnaz | Mar. 29, 1938 |
| 2,147,568 | Barber | Feb. 14, 1939 |
| Re. 16,796 | Keith | Nov. 22, 1927 |
| 2,381,358 | Marshall | Aug. 7, 1945 |
| 2,364,458 | McCollum | Dec. 5, 1944 |